United States Patent [19]

Paul

[11] Patent Number: 4,807,543
[45] Date of Patent: Feb. 28, 1989

[54] SEEDLING PLANTER

[76] Inventor: Lowell A. Paul, P.O. Box 557, Armstrong, British Columbia, Canada, V0E 1B0

[21] Appl. No.: 72,378

[22] Filed: Jul. 13, 1987

[51] Int. Cl.⁴ .............................................. A01C 11/02
[52] U.S. Cl. .......................................... 111/2; 111/89
[58] Field of Search ................... 111/2, 89, 3, 4, 6, 111/90, 91, 92, 93; 198/704

[56] References Cited

U.S. PATENT DOCUMENTS

| 577,539 | 2/1987 | Speidel. | |
|---|---|---|---|
| 2,595,689 | 5/1952 | Mitchell | 198/704 |
| 3,306,239 | 2/1967 | Martin | 111/3 |
| 3,450,073 | 6/1969 | Baker | 111/6 |
| 3,943,863 | 3/1976 | Leonard | 111/2 |
| 3,972,294 | 8/1976 | Grundstrom | 111/91 |
| 4,067,268 | 1/1978 | Lofgren | 111/2 |
| 4,111,135 | 9/1978 | Braun et al. . | |
| 4,116,137 | 9/1978 | Westerhoven . | |
| 4,290,373 | 9/1981 | Boots | 111/3 |
| 4,342,270 | 8/1982 | Lofgren | 111/2 |
| 4,344,374 | 8/1982 | Gangluff et al. . | |
| 4,459,924 | 7/1984 | Hasson | 111/2 |

FOREIGN PATENT DOCUMENTS

| 1117376 | 2/1982 | Canada | 111/89 |
|---|---|---|---|
| 2920754 | 12/1980 | Fed. Rep. of Germany | 111/2 |
| 1062892 | 4/1954 | France | 111/3 |
| 650540 | 3/1979 | U.S.S.R. | 111/3 |
| 337412 | 10/1930 | United Kingdom | 111/3 |
| 709237 | 5/1954 | United Kingdom | 111/3 |
| 982083 | 2/1965 | United Kingdom | 111/3 |

Primary Examiner—Mickey Yu
Assistant Examiner—Danton D. DeMille
Attorney, Agent, or Firm—Townsend and Townsend

[57] ABSTRACT

A seedling planter has a moveable platform with storage area for seedlings and a work area for a human operator. There is a power source for the planter. A mechanical planting system can plant seedlings and a conveyor introducing seedlings into the mechanical planting system.

23 Claims, 4 Drawing Sheets

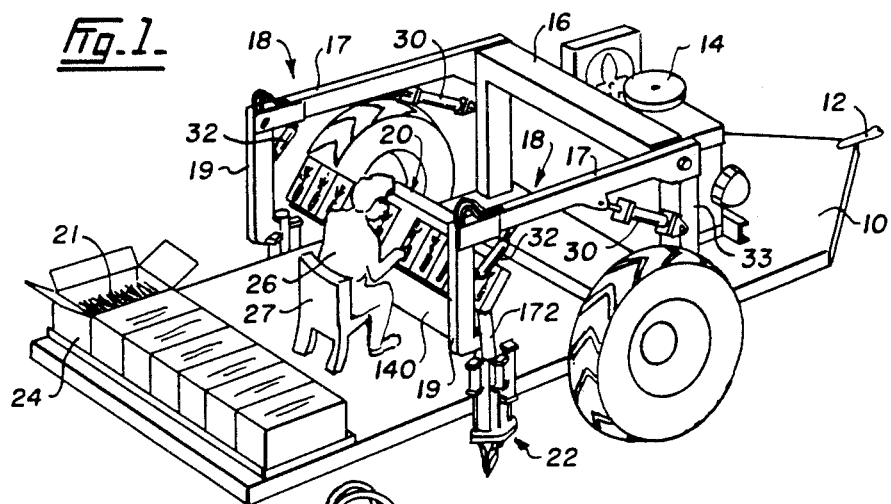
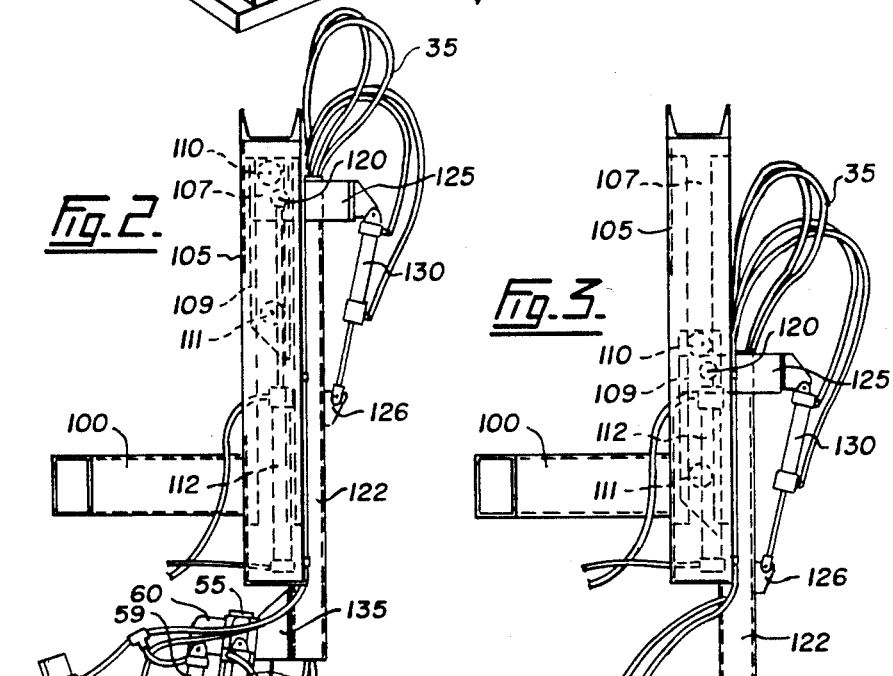

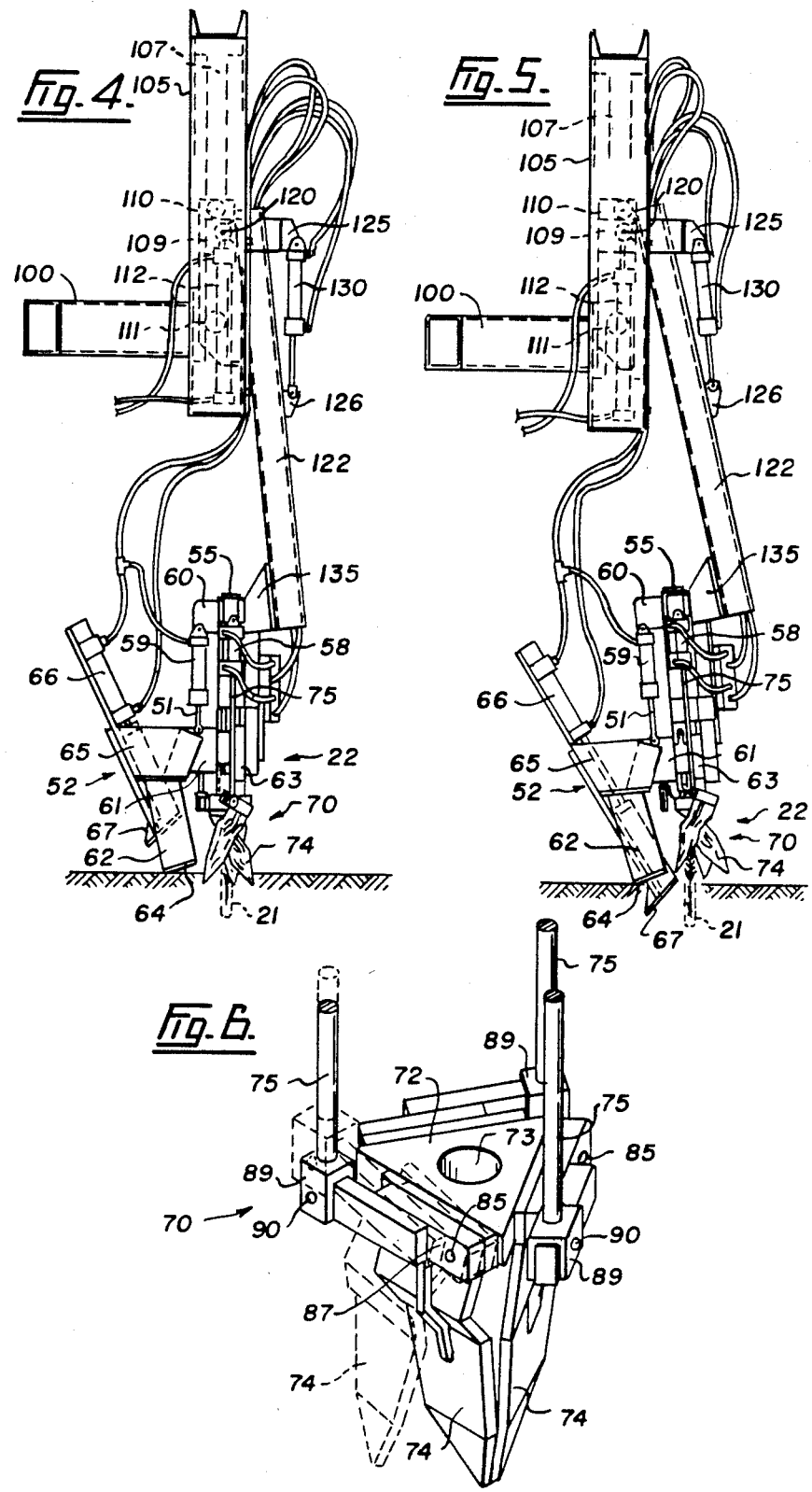

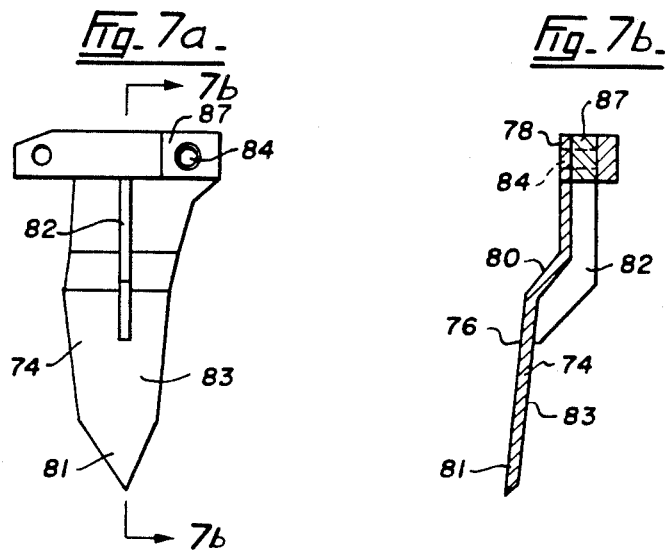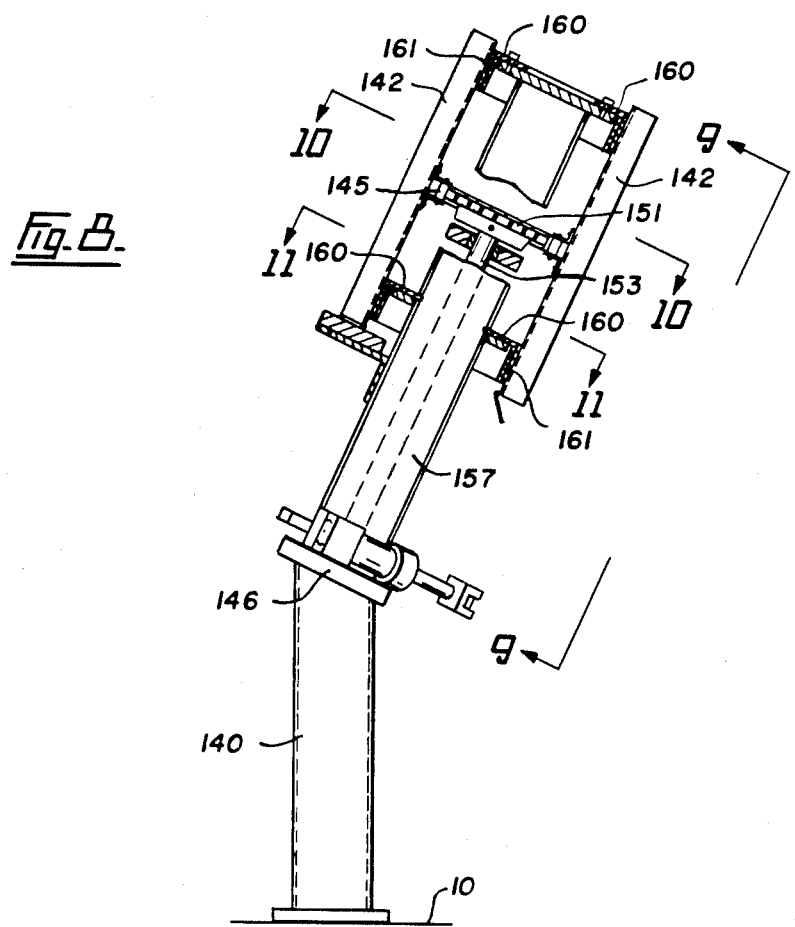

SEEDLING PLANTER

FIELD OF THE INVENTION

This invention relates to a device for mechanically planting seedlings, especially tree seedlings.

DESCRIPTION OF THE PRIOR ART

Mechanical planting machines are known. They are an ideal means to ensure accurate and rapid placement of plants with respect to horizontal spacing and depth. Tree planting, which is extremely strenuous on humans, is an ideal operation for automation.

Seedling planting machines must be very sturdy to perform their digging function and at the same time they must be capable of delicately and accurately holding living plants in order not to damage or destroy them during the planting process.

Some prior art seedling planters rely on pulling a plow or ripper blade through the soil in the direction of travel of the seedling planter. In some cases, the furrow or rip is held open by fins attached to the ripper, and the seedling is placed into the furrow. A set of packing wheels then closes the soil around the seedling. U.S. Pat. Nos. 4,116,137 and 4,344,374 disclose seedling planters that create a furrow or rip. There are some basic problems with this type of planter. Most importantly, there are generally obstructions in or on the ground to be planted such as rocks, roots and general debris that do not allow a clean cut to be made. As well, the roots of the newly planted seedlings tend to follow the path of the furrow in which they ae planted, and thus the roots become oriented in a straight line parallel to the soil surface. This is an unstable orientation and these trees have been known to fall or be blow over after eight or ten years. A further problem is that the furrow provides a path for erosion, particularly on sloping terain, which is focused around the seedling.

A different approach from the furrow seedling planter is the spot planter. In this design, the planting mechanism makes contact with the ground at one spot and does not move from that spot until the planting is complete. U.S. Pat. Nos. 577,539 and 4,111,135 are prior art examples of spot planters. U.S. Pat. No. 577,539 describes a spot planter that probes a hole, moves the probing tool away from the hole and then drops a seedling into the hole. This method has its drawbacks in that the hole in the soil tends to close by rebound of either the roots or humus that were displaced by the probe. In most clay soils, the suction created by withdrawing the tool is adequate to draw the soil back into the cavity. In either case, a probed hole is generally not reliable enough to provide a suitable cavity into which a seedling can be dropped. U.S. Pat. No. 4,111,135 discloses a spot planter that uses a special cartridge with a bullet nose in which the seedling is held and protected as the cartridge is fired into the ground. The cartridge is left in the ground for the seedling to grow out of. While this method appears to work, it has not been widely accepted, possibly because of the high material and labour costs involved.

SUMMARY OF THE INVENTION

The present invention is a seedling planter of spot planting design. The present invention is a seedling planter comprising a moveable platform with a storage area for seedlings and a work area for a human operator;
  power means for the apparatus;
  mechanical planting means for planting seedlings; and
  conveyor means for introducing seedlings into said mechanical planting means.

The present invention thus provides a seedling planter comprising a moveable platform that can move across a planting surface. In a preferred embodiment, a pair of mechanical planting means comprising reciprocating means with attached planting heads plant seedlings to a predetermined depth and horizontal spacing as the planter moves continuously across the planting surface. A human operator keeps the two mechanical planting means supplied with seedlings by feeding seedlings from a storage area into a centralized conveying means, which transports the seedlings to the mechanical planting means and automatically delivers the seedlings into the planting means at appropriate points in the planting cycle.

A seedling introduced into the planting means is delivered to and held in a pod assembly located at the lower end of the planting head. Planting of the seedling occurs when the reciprocating means is moved downwardly by actuating means causing the pod assembly to pierce the ground. This pod assembly comprises three pivotally mounted triangular cutting blades initially formed, in their closed position, into an essentially conical bore head able to hold in an upright position the seedling to be planted. This bore head pierces the ground to a predetermined depth detected by sensing means. When this predetermined depth is reached the three triangular cutting blades are pivotted upwardly and laterally through the soil by actuating means located on the planting head. This leaves the seedling in the cavity opened by the conical bore head. Slidable tamping means, also located on the planting head with actuating means attached, then compact the soil around the base of the seedling to complete the planting process. The reciprocating means with attached planting head is then raised upwardly and the triangular cutting blades returned to their closed position, ready to accept another seedling for planting.

The reciprocating means is desirably equipped with sensing means whereby, if the pod assembly cannot penetrate the ground, the planting attempt is aborted.

The present invention provides a sturdy, reliable and efficient means to plant the seedlings accurately at a prescribed depth and spacing, with no damage to the seedling. The present invention functions as a spot planter and places seedlings into the soil in a single operation and without having to rely on gravity to deliver the seedling to the bottom of the planting hole. As well, the present invention requires no special cartridge cover to protect the seedling while being planted.

DRAWINGS

Aspects of the invention are illustrated, merely by way of example, in the drawings in which:

FIG. 1 is a perspective view of a preferred embodiment of the present invention;

FIG. 2 shows the planting head attached to alternative reciprocating means from the shown in FIG. 1, in the ready position;

FIG. 3 shows the planting head, attached to alternative reciprocating means from that shown in FIG. 1, in the planting positions;

FIG. 4 shows the cutting blades of the pod assembly opening to release the seedling contained therein;

FIG. 5 shows a planting head, attached to alternative reciprocating means from that shown in FIG. 1, with the tamping means compacting the earth around the seedling;

FIG. 6 is a perspective view of a closed pod assembly with dotted lines showing a cutting blade in an open position;

FIG. 7a is a view of a triangular cutting blade.

FIG. 7b is a section view of a triangular cutting blade taken along line 7b—7b of FIG. 7a.

FIG. 8 is a sectional view of the conveying apparatus of the present invention;

DESCRIPTION OF THE PREFERRED EMBODIMENTS

Figure 9:
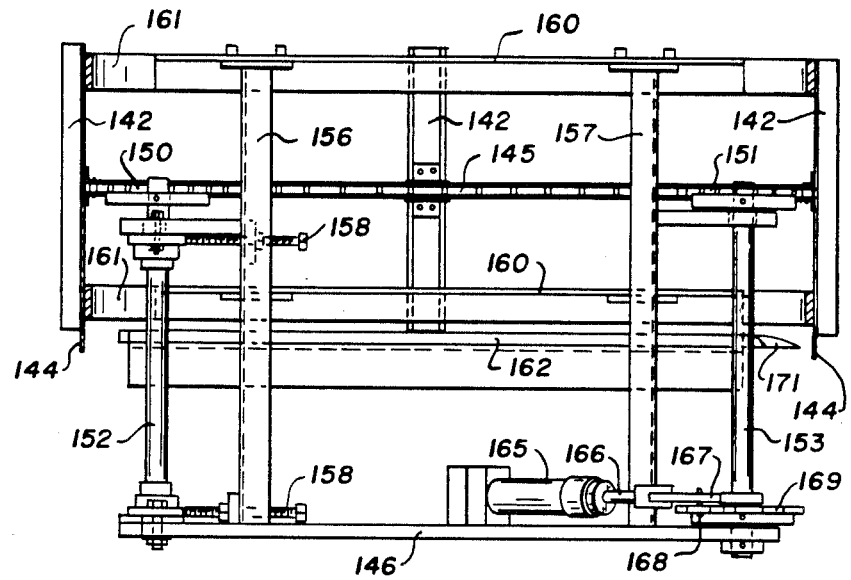
FIG. 9 is a sectional view of the conveying apparatus of the present invention taken along line 9—9 of FIG. 8.
Figure 10:
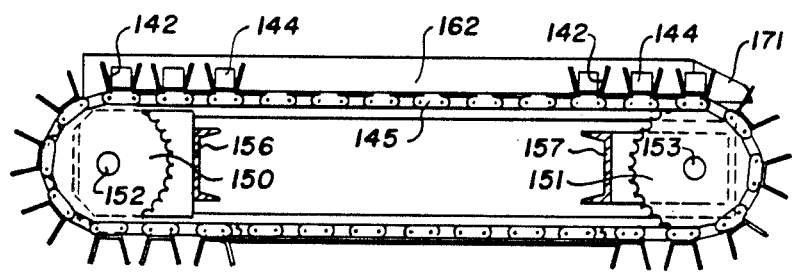
FIG. 10 is a sectional view of the conveying apparatus of the present invention taken along line 10—10 of FIG. 8.

FIG. 1 shows a preferred embodiment of the present invention. A wheeled platform 10, which can be connected to a towing tractor by hitch 12 forms the base upon which the seedling planter is constructed. Power source 14 comprises a diesel powered hydraulic pump and is positioned in front of frame 16. At the opposite end of the wheeled platform 10 is an area devoted to storage of the tree seedlings 21. Seedlings 21 are stored in wax cartons 24 in which typically they are shipped. The seedlings in these cartons are wrapped in plastic in quantities of twenty-five. Operator 26 sits just forward of the storage area in chair 27 where he can keep conveyor means 20 filled with seedlings 21 to be deposited in either of the two planting mechanisms designated generally by reference numeral 18. Conveyor means 20 is illustrated in FIGS. 1 and 8 to 11. The unit consists of two feeding conveyors extending outwardly from the center of platform 10 to each of the two planting mechanisms 18 with operator 26 seated at the centerline. Each of the feeding conveyors is constructed using the framework assembly shown in FIG. 8. Legs 140 are attached to moveable platform 10 and support angled base plate 146 with members 156 and 157 extending upwardly normal to plate 146. Axles 152 and 153, best shown in FIG. 9, extend upwardly and parallel to members 156 and 157. Axles 152 and 153 are supported at their lower ends by bearing mounts in base plate 146 and at their upper ends by bearing mounts in horizontal flanges extending outwardly from members 156 and 157. Axles 152 and 153 support sprockets 150 and 151 respectively. Carrier chain 145, consistign of a plurality of pivotally connected links, engages the teeth of cogs 150 and 151 and forms a closed loop around the cogs as is best shown in FIG. 10. As can be seen in FIG. 9, bearing mounts for axle 152 are engage in slotted holes in base plate 146 and the upper horizontal flange, and set screws 158 extending through member 156 allow for sideways movement and adjustment of axle 152 in order to adjust tension in carrier chain 145.

Carrier chain 145 supports a plurality of longitudinal seedling troughs 142 which are pivotally attached at the longitudinal midpoint of the rear of the seedling troughs to individual links of the chain. Each seedling trough 142 is an essentially U-shaped piece of sheet metal with angled sides and a flat rear face which provides an attachment surface to carrier chain 145. At the lower end of seedling trough 142 is hinged trap door 144. Seedling troughs 142 are supported at the upper and lower ends of their flat rear faces by four slide rails 160 attached to members 156 and 157 and extending across the front and rear of the conveyor frame. As can be seen in FIG. 8, slide rails 160 have an L-shaped cross section whose outwardly directed face is covered by plastic strip 161 which provides a low friction surface for seedling troughs 142 to slide over. Plastic strip 161 extends around the corners of the conveyor frame to form two closed upper and lower loops and provide a smooth path for seedling troughs 142 to slide over. Seedling troughs 142 are also supported at their lower hinged ends by slide rail 162 which is attached to members 156 and 157 and extends only along the front edge of the conveyor frame. Slide rail 162 is also covered by plastic strip 161 which prevents hinged doors 144 from opening as the seedling troughs travel across the front of the conveyor frame.

Figure 11:
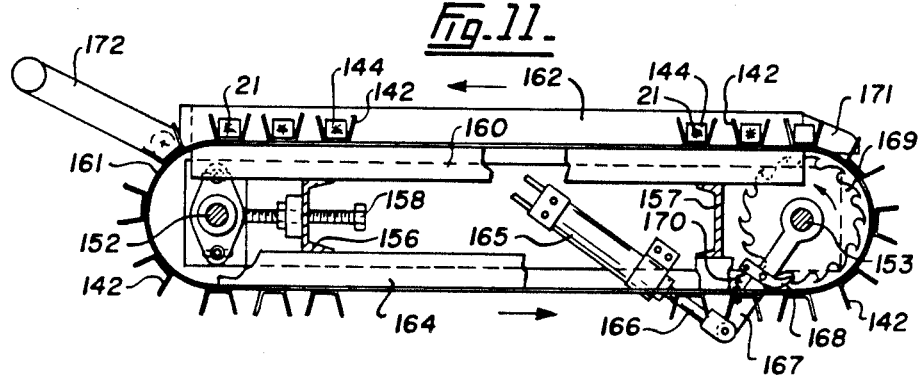
FIG. 11 is a sectional view of the conveying apparatus of the present invention taken along line 11—11 of FIG. 8.

Operation of the conveyor is controlled by hydraulic cylinder 165 located at the base of axle 153 as shown in FIG. 11. Hydraulic link 166 is pivotally conneced to axle 153 by link 167. Pawl 168 with biasing spring 170 is pivotally attached to link 167 and engages ratchet wheel 169 which is rigidly attached to axle 153. In operation, hydraulic link 166 is extended causing pawl 168 to rotate ratchet wheel 169 and axle 153 through a predetermined counterclockwise angle as viewed in FIG. 11, thereby rotating cog 151 and causing carrier chain 145 with attached seedling troughs 142 to move. Hydraulic link 166 is then returned to its unextended position with pawl 168 riding over the ratchet teeth in a known manner.

Each time hydraulic cylinder 165 advances carrier chain 145, attached seedling troughs 142 move counterclockwise as viewed in FIG. 11. Seedling troughs which are rotating about the right end of the conveyor shown in FIG. 11 encounter lip 171 of slide rail 162. This lip is formed to cause hinged trap doors 144 of each seedling trough to close smoothly. Once the trap door of a trough is closed, operator 26 can place a seedling 21 into the trough. At the left end of the conveyor as viewed in FIG. 11, slide rail 162 ends just before and above chute 172. Each time carrier chain 145 advances, a seedling trough slides off the end of slide rail 162 causing trap door 144 to open and seedling 21 to fall into chute 172 which delivers the seedling to planting mechanism 18. It should be remembered that the present invention is equipped with two of the feeding conveyors described above, each conveyor supplying seedlings 21 to each of the two planting mechanisms 18.

Both planting mechanisms 18 of the present invention comprise an upper reciprocating means for raising and lowering a lower planting head 22. In the preferred embodiment shown in FIG. 1, the reciprocating means consists of an upper horizontally disposed arm 17 pivotally connected to the upper corner of frame 16. Hydraulic cylinder 30 connects arm 17 with support 33 of frame 16. At the opposite end of arm 17 is pivotally attached a vertically disposed arm 19. At the lower end of arm 19 planting head 22 is rigidly attached. Arms 17 and 19 are connected by hydraulic cylinder 32 which can control the vertical angle of arm 19. Arms 17 and 19 have a hollow inner core to carry hydraulic lines 35 to connect hydraulic pump 14 to the various hydraulic cylinders necessary to operate the planting mechanism.

An alternating reciprocating means to that shown in FIG. 1 is shown in FIGS. 2 through 5. The reciprocating means illustrated performs an analogous function to the reciprocating means shown in FIG. 1 but with different operating parts. Referring to FIG. 3, horizontal arm 100 of box steel construction serves to mount the planting means to any suitable mounting member on platform 10. Vertical member 105 with central groove 107 is attached to horizontal arm 100. Carriage member 109, with upper wheel 110 and lower wheel 111, under the control of hydraulic cylinder 112 slides up and down groove 107. Attached to the upper portion of carriage member 109, at pivot point 120, is vertically disposed arm 122. Arm 122 is hollow to form a passageway for hydraulic line 35 to planting head 22. Flange 125 is rigidly attached to the upper end of carriage 109 and lower flange 126 is attached along the rear length of arm 122. Together they support hydraulic cylinder 130, which can control the vertical angle of arm 122. Attached to the lower inner end of arm 122 is flange 135 to which is rigidly mounted planting head 22.

Planting head 22 is best shown in FIG. 2 where it is attached to the previously described alternative reciprocating means. The planting head is generally designated by the numeral 22 and comprises a longitudinal, cylindrical central mounting member 55 to which other components of the planting head are attached.

Mounting means 55 has a hollow inner core 53 open at the both ends to forma passageway through which seedlings can be introduced into the pod assembly 70 at the lower end of the mounting member 55. Mounted about the outer circumference of the upper end of central mounting member 55 to appropriate mounting blocks are three hydraulic cylinders 58 with downwardly descending links 75 pivotably connected to the cutting blades of the lower pod assembly 70 which will be more fully described below. In FIG. 2 only one of these cylinders 58 is shown. A fourth hydraulic cylinder 59 is bolted to flange 60, which extends radially from the upper end of mounting member 55. This fourth hydraulic cylinder 59 uses link 51 to control the vertical movement of foot assembly 52 along central mounting member 55. Foot assembly 52 comprises circular housing 63 which fits slidably about central mounting member 55. Flange 61 extends radially from circular housing 63 providing an attachment point for link 51 of hydraulic cylinder 59 and for a pair of parallel space legs 62 with terminal horizontal flanges 64. Extending outwardly from spaced legs 62 are parallel spaced members 65 which support between them angled hydraulic cylinder 66 which controls tamping foot 67. Tamping foot 67 normally rests between parallel spaced legs 62, however, when hydraulic cylinder 66 is activated, tamping foot 67 is powered downwardly to compact soil around the newly planted seedling. Also shown in FIG. 2, is set screw 68 threadably received in a bracket extending outwardly from the upper edge of circular housing 63 of foot assembly 52. Set screw 68 is positioned so as to press switch 69 mounted on central mounting member 55 when foot assembly 52 travels a certain distance up central mounting member 55. This arrangement provides the means to control the depth to which pod assembly 70 is inserted into the ground as will be described hereinafter.

Pod assembly 70 shown in FIG. 6 is mounted at the base of central mounting member 55. The pod assembly 70 comprises an equilateral triangle mounting plate 72 with a central passageway 73 through its two faces to communicate with the hollow inner core 53 of central mounting member 55. Pivotally attached to each of the three edges of triangular mounting plate 72 by pins 85 are triangular cutting blades 74. These triangular cutting blades consist of inverted, elongate essentially isosceles triangular shapes shown in FIG. 7a and 7b with inner face 76 and outer face 83. Approximately ⅓ of the way down the blade, measured from the upper edge 78, is an inwardly directed bend creating angled face 80. A further outwardly directed bend is used to position apex surface 81 in a plane at a small acute angle to the vertical. Web 82 is attached to the upper outer surface 83 of cutting blade 74 and provides structural rigidity to the blade. Mounting member 87 is welded to outside face 83 just below upper edge 78. Hole 84 in mounting member 87 is shaped to receive pin 85 protruding from one end of one edge of triangular mounting plate 72, allowing each cutting blade 74 to pivot in a plane parallel to the edge of the triangular mounting plate 72 to which the cutting blade is attached. At the opposite end of mounting member 87 is pivotally attached clevis 89. Clevis pin 90 extends through mounting member 87 and through both faces of clevis 89 to secure both members together. Clevis 89 is rigidly attached to link 75, which extends upwardly to connect with hydraulic cylinder 58.

Pod assembly 70 with its three triangular cutting blades is the portion of the planting mechanism inserted into the ground. The process is accomplished by having the three cutting blades in a closed position as shown in FIG. 6 so that the side edges of the blades abut each other and, due to the inward bend of the apex portion of the triangular blade, the three apexes meet to form an inverted pyramid shape. When the pod assembly is in this closed position a seedling 21 can be held upright in the interior of the pod assembly 70 after being introduced into the pod through opening 73 of triangular mounting plate 72 and hollow inner core 53 of central mounting member 55. To release seedling 21 into the ground all three blades pivot about their respective pins 85 in a plane parallel to the edge of triangular mounting plate 72 as shown in FIG. 6. This pivoting motion is caused by hydraulic fluid being pumped into the lower portion of hydraulic cylinder 58 to cause the piston to move upwardly. This lifts link 75, raising the end of triangular blade 74 to which the clevis 89 is attached. All blades are arranged so that each will rotate laterally and upwardly in the same direction, either clockwise or counterclockwise, so that they do not interfere with each other. The result of this operation is that the seedling 21, which was held inside the pod assembly when the ground was penetrated, is now released into the hole created by the pod assembly. Furthermore, all controlling hydraulic cylinders 58 for the cutting blades 74 are connected in parallel so that if one blade meets an obstruction such as a rock or a root in its upward swing and is prevented from moving the remaining blades can continue to move to allow the planting procedure to finish.

The apparatus of the present invention work together in the following integrated manner to perform the planting function:

The seedling planter apparatus as shown in FIG. 1 is towed across the area to be planted by a tractor or other suitable towing device. The two planting means 18 are located on the seedling planter. The action of only one planting means will be discussed but it should be understood that both planting means follow the same cycle. The two planting means do not have to be synchronized in their operation, that is one can be planting a seedling while the opposite one is in the ready position.

At regular intervals the horizontal arm 17 of the planting menas 18 is powered downwardly by the contraction of hydraulic cylinder 30. Initially the pod assembly is in the ready position as shown in FIG. 2 with cutting blades 74 in the closed position, foot assembly 52 at the lower limit of its travel along central mounting member 55, and a seedling located in the pod assembly 70. While FIG. 2 shows the planting head 22 attached to alternative reciprocating means, the following description involves the reciprocating means shown in FIG. 1 utilizing horizontal arm 17 and vertical arm 19. Vertical arm 19 is the functional equivalent of vertical arm 122 of the alternative reciprocating means.

As shown in FIG. 3, the planting means 22 is powered downwardly with sufficient force to drive pod assembly 70 into the ground. The tip of pod assembly 70 and terminal flanges 64 of foot assembly 52 strike the ground at approximately the same time. At this time, hydraulic cylinder 59 which controls the vertical movement of foot assembly 52 is not pressurized and therefore offers little resistance to the vertical movement of foot assembly 52. As a result, as pod assembly 70 is pressed into the ground, central mounting member 55 slides through circular housing 63 of foot assembly 52 since foot assembly 52 is prevented from further downward movement due to contact with the ground surface. Central mounting member 55 slides through circular housing 63 of foot assembly 52 driving pod assembly 70 into the ground until set screw 68 contacts switch 69 as shown in FIG. 3. Once switch 69 is pressed indicating that the desired planting depth has been reached, the downward movement of planting head 22 is stopped and hydraulic cylinder 30 is put into a float mode where both of its ends are connected to the hydraulic reservoir of the planter's hydraulic system so that cylinder 30 offers little resistance to up or down motion. Obviously, the desired planting depth is easily set by adjusting the position of set screw 68 in its threaded bracket. As well as stopping planting head 22 from moving downwardly, switch 69 activates hydraulic cylinders 58 which control the cutting blades through links 75. Hydraulic fluid is pumped into the lower end of each cylinder 58, causing each cutting blade 74 to pivot laterally and upwardly about pin 85 as shown in FIG. 4. Seedling 21 is thus released into the hole created by the penetration of the pod assembly 70. The upper portions of hydraulic cylinders 59 and 66 are connected by a single hydraulic line and a hydraulic sequence valve allows hydraulic fluid to be directed to the upper portion of cylinder 66 and the upper portion of cylinder 59 after sufficient pressure has been developed in cylinders 58 to ensure that the cutting blades 74 are either open or have met an obstruction. Pressure in the upper portion of cylinder 66 causes tamping foot 67, mounted between the two parallel legs 62 of foot assembly 52, to move downwardly directing and compacting soil arond the newly planted seedling 21 as shown in FIG. 5. At the same time, pressure in the upper portion of cylinder 59 causes link 51 to push downwardly on foot assembly 52. Because hydraulic cylinder 30 is in a float mode, the downward pressure of link 51 causes central mounting member 55 to begin rising from the ground. Central mounting member 55 slides upwardly through circular housing 63 of foot assembly 52, the downward force exerted by link 51 being transmitted to the ground by feet 64 of foot assembly 52.

The downward force of link 51 also prevents foot assembly 52 from being lifted off the ground due to the force exerted by tamping foot 67. Once tamping foot 67 has completed its stroke, the planting processing is over. Hydraulic cylinder 30 is released from the float mode and horizontal arm 17 is powered upwardly to lift planting head 22 from the ground.

The operation of the alternative reciprocating means shown in FIG. 2 to 5 is similar to that of the reciprocating means shown in FIG. 1. In order for planting head 22 to be moved upwardly or downwardly, hydraulic fluid is pumped into the bottom or top of hydraulic cylinder 112. Hydraulic cylinder link 113 which is attained to carriage member 109 exerts a force on the carriage member which moves in central groove 107. This movement of carriage member 109 causes a corresponding up or down movement of vertical arm 122 which is attached to carriage member 109 at pivot point 120. Hydraulic cylinder 130 attached to the rear of vertical arm 122 and flange 125 acts as a damper for vertical arm motion.

It is important to note that throughout the entire planting process, the seedling planter platform 10 remains in motion. As a result, as can be seen in the sequence of FIGS. 3 through 5, vertical arm 122 equivalent to vertical arm 19 varies increasingly from the vertical as the planting process continues due to the planting head being stationary while the platform 10 continues in motion. In the reciprocating means shown in FIG. 1, the pivoting connections between horizontal arm 17 and vertical arm 19 allow for this angular motion. In the alternative reciprocating means this angular motion is accommodated by pivot point 120. The angular motion of the vertical arms of the two embodiments of the reciprocating means is used to control the planting abort procedure of the present invention which protects the planter from attempting to plant when the ground is too hard or when rocks or debris block the planting hole. Depending on the reciprocating means being used, pod assembly 70 is pressed into the ground due to the action of hydraulic cylinder 30 or 112, the hydraulic cylinder being set to exert a maximum predetermined pressure. If this maximum pressure is reached and set screw 68 does not press switch 69 to indicate that pod assembly 70 has been inserted to the desired depth, hydraulic cylinder 30 or 112 will continue exerting its downward force until vertical arm 19 or 122 swing through a pre-set angle as monitored by hydraulic cylinder 32 or 130 respectively. If pod assembly 70 has not penetrated the ground with the predetermined pressure before the vertical arm has swung through the pre-set angle, the planting attempt is aborted. The planting head is raised to the ready position and a signal sent to the conveyor means 20 not to deliver another seedling to the planting head to prevent double loading of the pod assembly. The planting mechanism 18 is now ready to being an entirely new planting attempt.

After a successful planting attempt, planting head 22 is raised from the ground and returned to the ready position. After the previous planting cycle, foot assembly 52 rests at its lower position on central mounting member 55 atop triangular mounting plate 72. Hydraulic fluid is released from the upper portion of cylinder 59 and the cylinder is returned to a non-pressurized state. Hydraulic fluid is pumped into the lower portion of hydraulic cylinder 66 causing tamping foot 67 to be retracted to the ready position. As well hydraulic fluid is pumped into the upper portion of hydraulic cylinder 58 to lower the cylinders internal pistons and rotate cutting blades 74 into their crossed position through the action of links 75, reforming the pod assembly 70 into its inverted pyramid shape. The planting head 22 is now ready to be loaded with another seedling.

Planting head 22 is positioned so that hollow inner core 53 of central mounting member 55 is located directly beneath chute 172 of conveyor means 20. If the previous planting process was successful, and not aborted according to the planting abort procedure previously described, then hydraulic cylinder 165 of a feeding conveyor is extended to rotate ratchet wheel 169 and advance the conveyor by one seedling trough 142. This causes a seedling to be released from the outermost trough of the conveyor to fall down chute 172, through hollow inner core 53 of central mounting member 55, through passageway 73 in traingular mounting plate 72 into the interior of pod assembly 70 formed by cutting blades 74 in their closed position. Planting mechanism 18 is now ready to repeat its planting cycle. Each time carrier chain 145 of a feeding conveyor is moved to release a seedling 21 into the planting mechanism, an empty seedling trough 142 appears before operator 26 who is seated in the central area of moveable platform 10 so that he has access to each of the two feeding conveyors which supply planting mechanism 18. It is the operator's job to fill all empty seedling trough 142 with seedlings as the empty troughs appear before him.

The operator replenishes his supply of seedlings from storage cartons 24 located on the rear of moveable platform 10.

I claim:

1. A seedling planter comprising:
   reciprocating means; and
   a planting head comprising: a central mounting member having a hollow inner core and attached to said reciprocating means for essentially vertical reciprocatory movement;
   a foot assembly slidably mounted about said central mounting member having means for lowering said foot assembly;
   a pod assembly mounted to the lower end of said central mounting member for insertion into the ground to create a planting location into which a seedling is deposited, said pod assembly comprising a planar mounting plate having a central access passage extending through the faces of said plate communicating with said hollow inner core of said central mounting member, said mounting plate having at least three side edges, cutting blades pivotally mounted to the side edges of said mounting plate with means for pivoting said cutting blades from a closed position in which said blades define an enclosure to house a seedling to be planted to an open position in which said blades pivot upwardly in a plane parallel to said side edges to release said seedling into the ground; and
   tamping means attached to said central mounting member with means for raising and lowering said tamping means to compact the ground about said planting location.

2. A planter as claimed in claim 1 in which the pod assembly comprises an equilateral triangular mounting plate having a cutting blade pivotally connected to each of the mounting plate's three side edges.

3. A planter as claimed in claim 2 in which the cutting blades comprise a set of three inverted. elongate, essentially isosceles triangular blades, each blade having a short edge and two long edges that meet at an apex, the short edge being pivotally mounted to a side edge of said triangular mounting plate, said cutting blades having an inwardly directed bend and a second outwardly directed bend extending across said blade between said long edges so that the plane of the apex of the blade froms an acute angle to the plane of the short edge, the long edges of said cutting blades being shaped to mate with the corresponding long edges of the adjacent blades when said cutting blades are in a closed position.

4. A planter as claimed in claim 1 in which said means for pivoting said cutting blades is a plurality of hydraulic cylinders.

5. A planter as claimed in claim 1 in which the foot assembly includes a pair of downwardly extending parallel spaced legs.

6. A planter as claimed in claim 5 in which said tamping means is mounted to said foot assembly and comprises a tamping foot positioned between the spaced parallel legs of said foot assembly, whereby said tamping foot is powered downwardly from a retracted position between the spaced parallel legs of said foot assembly by said means for raising and lowering said tamping means to an extended position in contact with the ground in order to direct and compact dirt around the base of a newly planted seedling.

7. A planter as claimed in claim 6 in which said means for raising and lowering said tamping means is a hydraulic cylinder.

8. A planter as claimed in claim 1 in which the means for lowering the foot assembly is a hydraulic cylinder.

9. A planter as claimed in claim 1 including planting depth control means comprising a stop mounted to said foot assembly, and a switch mounted to said central mounting member such that as said pod assembly is inserted into the ground and said central mounting member slides downwardly in relation to said foot assembly, said stop will contact said switch to stop said central mounting member's downward movement and the resulting insertion of the pod assembly into the ground.

10. A planter as claimed in claim 1 in which said planter is mounted to a moveable platform having a storage area for seedlings, a work area for a human operator, and conveying means for automatically introducing seedlings into said planter.

11. A planter as claimed in claim 10 in which said moveable platform has a powered hydraulic pump to drive said hydraulic cylinders.

12. A planter as claimed in claim 10 in which said moveable platform has a power take off attachment for driving said planter.

13. A planter as claimed in claim 10 in which the moveable platform comprises a trailer mounted behind a tractor.

14. A planter as claimed in claim 10 in which the conveying means comprises an infinite loop conveyor with drive means, means to hold and carry seedlings, and means to release seedlings for introduction into said seedling planter.

15. A planter as claimed in claim 14 in which said drive means comprises a chain with attached means to hold and carry seedlings, said chain being looped arounbd driving cogs, said cogs being rotated by a pawl and ratchet system controlled by actuating means to advance the chain.

16. A planter as claimed in claim 15 in which said actuating means is a hydraulic cylinder.

17. A planter as claimed in claim 15 in which said means to hold and carry seedlings comprises a plurality of upright longitudinal troughs, each trough having an essentially U-shaped cross section having angled sides and a flat rear face attached to said chain, the lower end of said trough having a pivotally connected flap, the opening of said flap serving to release a seedling from its resting position within the troughs.

18. A planter as claimed in claim 17 in which said means to release seedlings comprises a flat surface extending below a portion of said conveying means and positioned so as to cause the pivotally connected flaps of said longitudinal troughs to remain closed until said drive means advances said chain causing a longitudinal trough to advance beyond the edge of said flat surface allowing said pivotally connected flap to open due to gravity, thereby releasing a seedling contained therein to fall into said planting mechanism.

19. A planter as claimed in claim 18 in which an angled chute directs a released seedling into said planting mechanism.

20. A planter as claimed in claim 10 in which the reciprocating means comprises a horizontally disposed upper arm pivotally mounted to said moveable platform with attached first actuating means, a vertically disposed arm pivotally mounted to said horizontally disposed arm with attached second actuating means, and with said planting head attached toward the lower end of said vertically disposed arm.

21. A planter as claimed in claim 20 in which said first and second actuating means are hydraulic cylinders.

22. A planter as claimed in claim 21 in which said actuating means is a hydraulic cylinder.

23. A planter as claimed in claim 10 in which said reciprocating means comprises actuating means, a vertical grooved support member attached to said moveable platform, a carriage member slidably mounted in said grooved support member, a vertically disposed arm pivotally connected at its upper end to said carriage member with said planting head rigidly attached toward the lower end of said vertically disposed arm.

* * * * *